United States Patent [19]
Staley

[11] 3,962,573
[45] June 8, 1976

[54] DIGITAL FUNCTION GENERATOR

[75] Inventor: Lewis E. Staley, Marion, Iowa

[73] Assignee: Rockwell International Corporation, El Segundo, Calif.

[22] Filed: June 12, 1975

[21] Appl. No.: 586,480

[52] U.S. Cl. .............................. 235/156; 235/164; 235/176
[51] Int. Cl.² ........................................ G06F 7/38
[58] Field of Search ...... 235/152, 156, 197, 150.53, 235/176, 168, 164; 328/14

[56] References Cited
UNITED STATES PATENTS

| | | | |
|---|---|---|---|
| 3,325,630 | 6/1967 | Murakami | 235/152 |
| 3,524,049 | 8/1970 | Gotz et al. | 235/156 |
| 3,636,337 | 1/1972 | Dietel et al. | 235/197 |
| 3,757,261 | 9/1973 | Sather | 235/152 |

Primary Examiner—Joseph F. Ruggiero
Attorney, Agent, or Firm—Terry M. Blackwood; Robert J. Crawford

[57] ABSTRACT

Digital function generator apparatus providing an output Y from an input X according to $$Y = \sum_{j=0}^{n} A_j X^j \pm Q .$$

Included in the apparatus is a digital memory, a digital adder, a digital multiplier, and also timing control means.

7 Claims, 7 Drawing Figures

WHERE K = +1, 0, OR −1 DEPENDING ON SIGNALS AT ADD AND SUB

| WORD TIME | IN$_1$ | SR15 OUT & ALSO MULT. AT i$_{2m}$ | ROM DATA OUT & ALSO ADDER 25 AT i$_{1a}$ | MULTIPLIER OUT & ALSO ADDER 25 AT i$_{2a}$ | ADDER 25 OUT & ALSO MULTIPLIER AT i$_{1m}$ | SR17 OUT | AUX. ADDER OUT | OUT$_1$ | S$_{cy}$ | S$_{fr}$ |
|---|---|---|---|---|---|---|---|---|---|---|
| 1 | X(t$_1$) | G$_1$ | A$_{15}$ | G$_2$ | A$_{15}$ | G$_3$ | G$_4$ | G$_4$ | H | H |
| 2 | " | X(t$_1$) | A$_{15}$ | PP1 | PP1+A$_{15}$ | A$_{15}$ | A$_{15}$−Q | " | L | L |
| 3 | " | " | A$_{15}$ | PP2 | PP2+A$_{15}$ | A$_{15}$ | A$_{15}$−Q | " | " | L |
| ⋮ | | | | | | | | | | |
| 16 | " | " | A$_{15}$ | PP15 | PP15+A$_{15}$ | A$_{15}$ | A$_{15}$−Q | " | " | L |
| 17 | " | " | A$_{14}$ | A$_{15}$ X(t$_1$)=P$_1$ | P$_1$+A$_{14}$=W$_1$ | A$_{15}$ | A$_{15}$−Q | " | " | H |
| 18 | " | " | A$_{14}$ | PP1 | PP1+A$_{14}$ | W$_1$ | W$_1$−Q | " | " | L |
| 19 | " | " | A$_{14}$ | PP2 | PP2+A$_{14}$ | W$_1$ | W$_1$−Q | " | " | L |
| ⋮ | | | | | | | | | | |
| 32 | " | " | A$_{14}$ | PP15 | PP15+A$_{14}$ | W$_1$ | W$_1$−Q | " | " | L |
| 33 | " | " | A$_{13}$ | W$_1$ X(t$_1$)=P$_2$ | P$_2$+A$_{13}$=W$_2$ | W$_1$ | W$_1$−Q | " | " | H |
| 34 | " | " | A$_{13}$ | PP1 | PP1+A$_{13}$ | W$_2$ | W$_2$−Q | " | " | L |
| ⋮ | | | | | | | | | | |
| 48 | " | " | A$_{13}$ | PP15 | PP15+A$_{13}$ | W$_2$ | W$_2$−Q | " | " | L |
| 49 | " | " | A$_{12}$ | W$_2$ X(t$_1$)=P$_3$ | P$_3$+A$_{12}$=W$_3$ | W$_2$ | W$_2$−Q | " | " | H |
| 50 | " | " | A$_{12}$ | PP1 | PP1+A$_{12}$ | W$_3$ | W$_3$−Q | " | " | L |
| ⋮ | | | | | | | | | | |
| 65 | " | " | A$_{11}$ | W$_3$ X(t$_1$)=P$_4$ | P$_4$+A$_{11}$=W$_4$ | W$_3$ | W$_3$−Q | " | " | H |
| ⋮ | | | | | | | | | | |
| 225 | " | " | A$_1$ | W$_{13}$ X(t$_1$)=P$_{14}$ | P$_{14}$+A$_1$=W$_{14}$ | W$_{13}$ | W$_{13}$−Q | " | " | H |
| ⋮ | | | | | | | | | | |
| 240 | " | " | A$_1$ | PP15 | PP15+A$_1$ | W$_{14}$ | W$_{14}$−Q | " | " | L |
| 241 | " | " | A$_0$ | W$_{14}$ X(t$_1$)=P$_{15}$ | P$_{15}$+A$_0$=W$_{15}$=$\sum_{j=0}^{15}$A$_j$x$^j$ | W$_{14}$ | W$_{14}$−Q | " | " | H |
| 242 | " | " | A$_0$ | PP1 | PP1+A$_0$ | W$_{15}$ | W$_{15}$−Q | " | " | L |
| ⋮ | | | | | | | | | | |
| 256 | " | " | A$_0$ | PP15 | PP15+A$_0$ | W$_{15}$ | W$_{15}$−Q | " | " | L |
| 257 | X(t$_2$) | " | A$_{15}$ | W$_{15}$ X(t$_1$) | A$_{15}$ | W$_{15}$ | W$_{15}$−Q | W$_{15}$+Q | H | H |
| 258 | " | X(t$_2$) | A$_{15}$ | PP1 | PP1+A$_{15}$ | A$_{15}$ | A$_{15}$−Q | " | L | L |
| ⋮ | | | | | | | | | | |
| 273 | " | " | A$_{14}$ | A$_{15}$ X(t$_2$)=P$'_1$ | P$'_1$+A$_{14}$=W$'_1$ | A$_{15}$ | A$_{15}$−Q | " | " | H |
| ⋮ | | | | | | | | | | |

Q → DIGITAL WORD AT IN$_2$
G$_1$, G$_2$, G$_3$ → EACH CAN BE ANY DIGITAL WORD
G$_4$ → G$_3$−Q
PP1, PP2, ETC. → 1ST, 2ND, ETC. PARTIAL PRODUCTS

H → HIGH (i.e., LOGIC "ONE")
L → LOW (i.e., LOGIC "ZERO")

FIG. 6

DIGITAL FUNCTION GENERATOR

This invention relates generally to electronics and to digital processing, and more specifically to serial digital function generating apparatus.

Particular transfer functions, whether formulated as exact mathematical expressions or graphical or tabular statements, are commonly electronically implemented with such devices as properly programmed general purpose digital or analog computers, or even large digital memories which store, for each input, a correlative value of the function. For some environments and/or applications, such conventional function generators leave something to be desired. For instance, some non-linear relationships such as the well-known one between pressure and altitude must somehow be implemented aboard aircraft so as to derive necessary information, such as altitude, from available information, such as pressure. However, for many aircraft, especially those of small to medium size, the size, cost, weight, and complexity of the on-board avionics equipment must be considered and such factors frequently discourage the use therein of conventional digital computer implementations and/or large memory implementations of function generators. Yet, analog implementations many times fail to provide the reliability and accuracy available with digital computer or memory techniques, and moreover, can themselves be quite complex.

In accordance with the present invention, a function generating apparatus features the accuracy of digital computation or digital memories and the suitability for incorporation into avionics equipment.

These and other features, objects, and advantages of the invention will become more apparent upon reference to the following specification, claims, and appended drawings in which:

FIG. 6 illustrates an example of the digital words found at various locations in the FIG. 1a apparatus for selected word times.

Figure 1A:
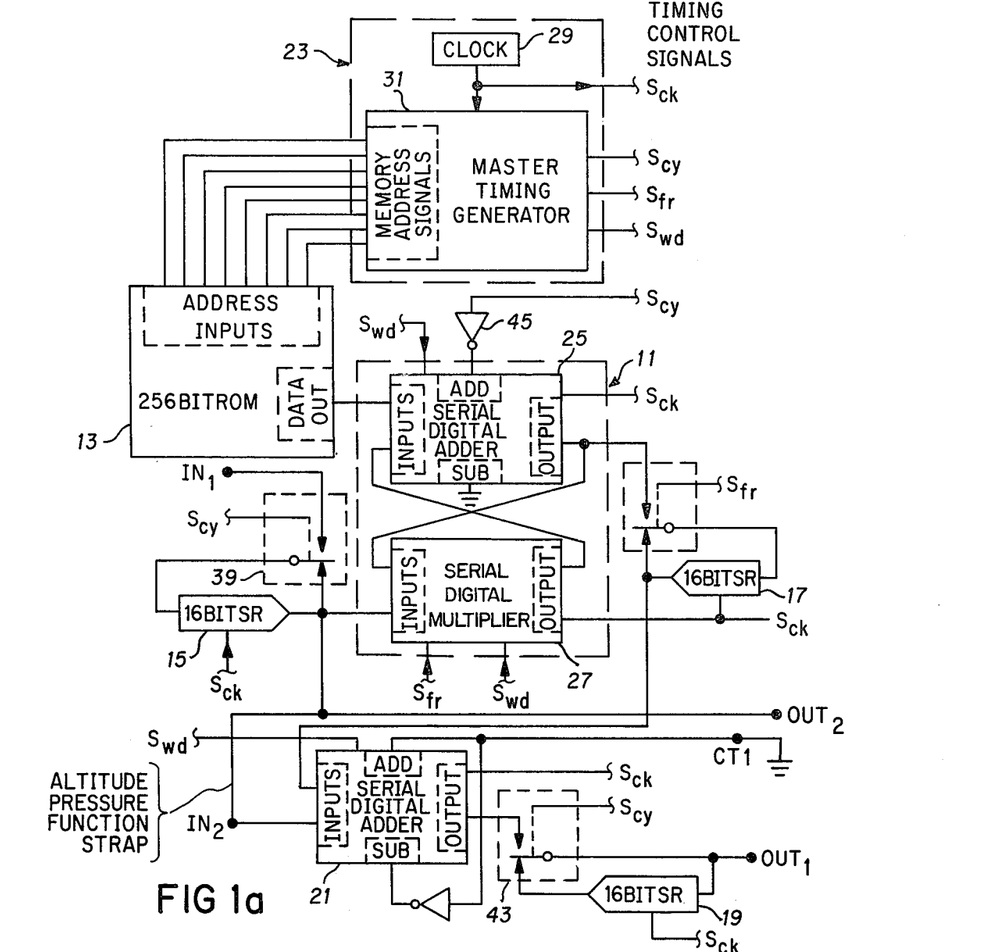
FIG. 1a is a block circuit diagram illustrating the preferred embodiment, for a particular application, of the present invention.
Figure 1B:
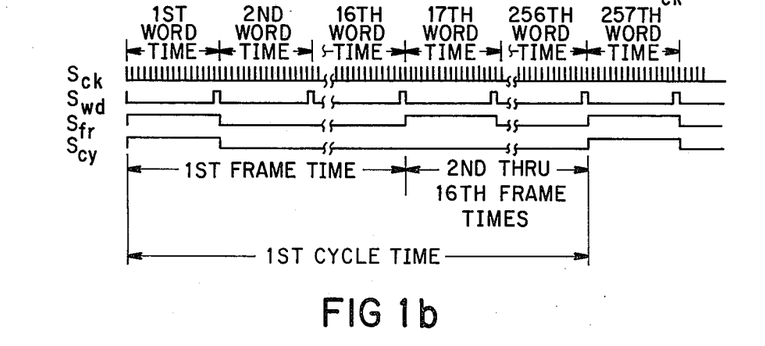
FIG. 1b depicts timing waveforms useful in understanding the operation of the FIG. 1a apparatus.

As seen from FIG. 1a, the presently preferred embodiment of this invention comprises an arithmetic unit 11, a read only memory (ROM) 13, temporary memories 15, 17, and 19 with switchable inputs for writing, an auxiliary adder 21, and a timing control unit 23 for effecting the appropriate operational sequencing. FIG. 1b depicts the relationship between the timing control signals $S_{ck}$, $S_{cy}$, $S_{fr}$, and $S_{wd}$ emanating from the timing control unit 23. (It should be noted that for clarity in FIG. 1a, instead of using direct line connections to represent electrical connections carrying the four timing control unit outputs $S_{ck}$, $S_{cy}$, $S_{fr}$, and $S_{wd}$ to the inputs of the other elements, these other element inputs are labeled with the appropriate signal notation.) Although a more detailed structural and operational description will be presented hereinbelow, an overview or outline of same will first be presented. Basically, the apparatus of FIG. 1a evaluates an $n$th degree function in one variable Y= polynomial $f(X) \pm Q$ where polynomial $$f(X) = \sum_{j=0}^{n} A_j X^j$$

or expanding, polynomial $f(X) = A_n X^n + A_{n-1} X^{n-1} + \ldots + A_2 X^2 + A_1 X + A_0$ where the coefficients $A_j$ are predetermined, $n=15$, and $Q$ is an additional function used to help the polynomial achieve the desired degree of curve fitting. More particularly, since $X$ is in general time variable and since a small but finite time is required for each evaluation, the apparatus of FIG. 1a operates cyclically and produces a series of regular outputs $Y(t_1)$, $Y(t_2)$ . . . etc., each of which represents an evaluation of the function using a correlative time sampled value of $X$, i.e., $X(t_1)$, $X(t_2)$, . . . etc. The evaluation of the polynomial portion of the function proceeds according to the nested form of the polynomial where the nested form of $$A_n X^n + A_{n-1} X^{n-1} + \ldots + A_2 X^2 + A_1 X + A_0$$

is $X(X( \ldots (X(X(X(A_n) + A_{n-1}) + A_{n-2}) + A_{n-3}) \ldots + A_2) + A_1) + A_0$. More simply, if the desired polynomial is, for example, of third degree, i.e., $A_3 X^3 + A_2 X^2 + A_1 X + A_0$, then $A_4$ through $A_{15}$ are all zero and the nested form reduces to $X\{X[X(A_3) + A_2] + A_1\} + A_0$.

The coefficients $A_0$ through $A_{15}$ are predetermined and stored in digital form in memory 13. A particular value $X(t_1)$ of the variable $X$, represented in digital format, is introduced at input $IN_1$ and is stored for an appropriate time in a recirculating temporary memory, i.e., shift register 15. At the appropriate time, timing control unit 23 causes the coefficient $A_{15}$ in digital format to flow through the serial digital adder 25, without alteration, and to enter multiplier 27. Serial digital multiplier 27, also under the control of timing control unit 23, and having $A_{15}$ and $X(t_1)$ (both in digital format) available, multiplies $A_{15}$ and $X(t_1)$ so as to produce serial digital data representative of the product $A_{15} \cdot X(t_1)$. This output product flows back to serial digital adder 25 and is summed with $A_{14}$ to produce serial digital data representative of $A_{15} \cdot X(t_1) + A_{14}$. This sum is circulated to multiplier 27 for an additional multiplication by $X(t_1)$ so that $X(t_1)[A_{15} \cdot X(t_1) + A_{14}]$ is produced. Under the control of timing control unit 23, the above sequences continue alternately multiplying and adding at least until the coefficient $A_0$ has been added, and the result polynomial $f(t_1)$ formed and appearing at the adder 25 output. This final value polynomial $f(t_1)$ is retrieved by the temporary storage shift register 17 and is passed along to the auxiliary adder 21. For present purposes, it will be assumed that $IN_2$ is at a logic zero (i.e., grounded and that the strap, for the altitude versus pressure function, between $OUT_2$ and $IN_2$ has been removed) so that polynomial $f(t_1)$ is unaltered by adder 21. Under such assumption, polynomial $f(t_1)$ in digital format passes unaltered through adder 21 and into shift register 19 there to be stored for the duration of the next evaluation cycle which is performed using $X(t_2)$.

A present application of the FIG. 1 apparatus involves the generation of digital data representing altitude from inputs of digital data representing pressure. To begin with, the well-known nonlinear (but continuous) relationship between altitude and pressure is mathematically approximated with a 10th order, single variable polynomial $$\sum_{j=0}^{n} A_n X^n$$

over a predetermined, closed interval of 3.5 to 31.0 inches of mercury. (For equations and tabular expressions of this relationship see National Advisory Committee for Aeronautics Report 1235 (NACA-TR-1235) Standard Atmosphere - Tables and Data for Altitudes to 65,800 Feet 1955.) Although several methods of curve fitting are available, the least squares method is presently employed for evaluating the coefficients $A_0$ through $A_{10}$. Once these 11 coefficients are determined, they are entered and stored in ROM 13, each coefficient being represented by a 16 bit two's complement digital word whose most significant bit (MSB) is a sign bit. With the introduction at $IN_1$ of a pressure representative input (i.e., a 16 bit digital word representative of $X(t_1)$), computation of the correlative altitude (i.e., polynomial $f(t_1)$) proceeds as basically and briefly outlined above.

Although multiplier 27 operation will be described more fully hereinbelow, its initial effect is to produce and make available during the 17th word time, a 16 bit serial word whose bits are the 16 most significant bits of the product $A_{15} \cdot X(t_1)$. Also during the 17th word time, the product $A_{15} \cdot X(t_1)$ appears at adder data input $i_{2a}$, is summed with the 16 bit word representing $A_{14}$ to product $A_{15} \cdot X(t_1) + A_{14}$, and this sum is loaded into multiplier 27. During the 33rd word time, the product $[A_{15} \cdot X(t_1) + A_{14}]X(t_1)$ is made available at the multiplier data output and is summed in adder 25 with $A_{13}$ and this sum is loaded into multiplier 27. This sequence continues, and during the 241st word time, the 16 bit word representing the final result becomes available at the adder 25 data output and is entered into shift register 17. This final result is available at shift register 17 output during the 242nd through 257th word times. During the 257th word time, the final result in shift register 17 is combined with the word at $IN_2$ and the combination appears at $OUT_1$ and is entered into shift register 19 which makes the combination available at $OUT_1$ through the 512th word time.

Attention will now be turned to a more detailed description of the FIG. 1a apparatus. Also, for use hereinbelow, unless otherwise specified, one word is 16 bits, one frame is 16 words or $256=2^8$ bits, and one cycle is 16 frames or 256 words or $4096=2^{12}$ bits.

TIMING CONTROL UNIT

Figure 2:
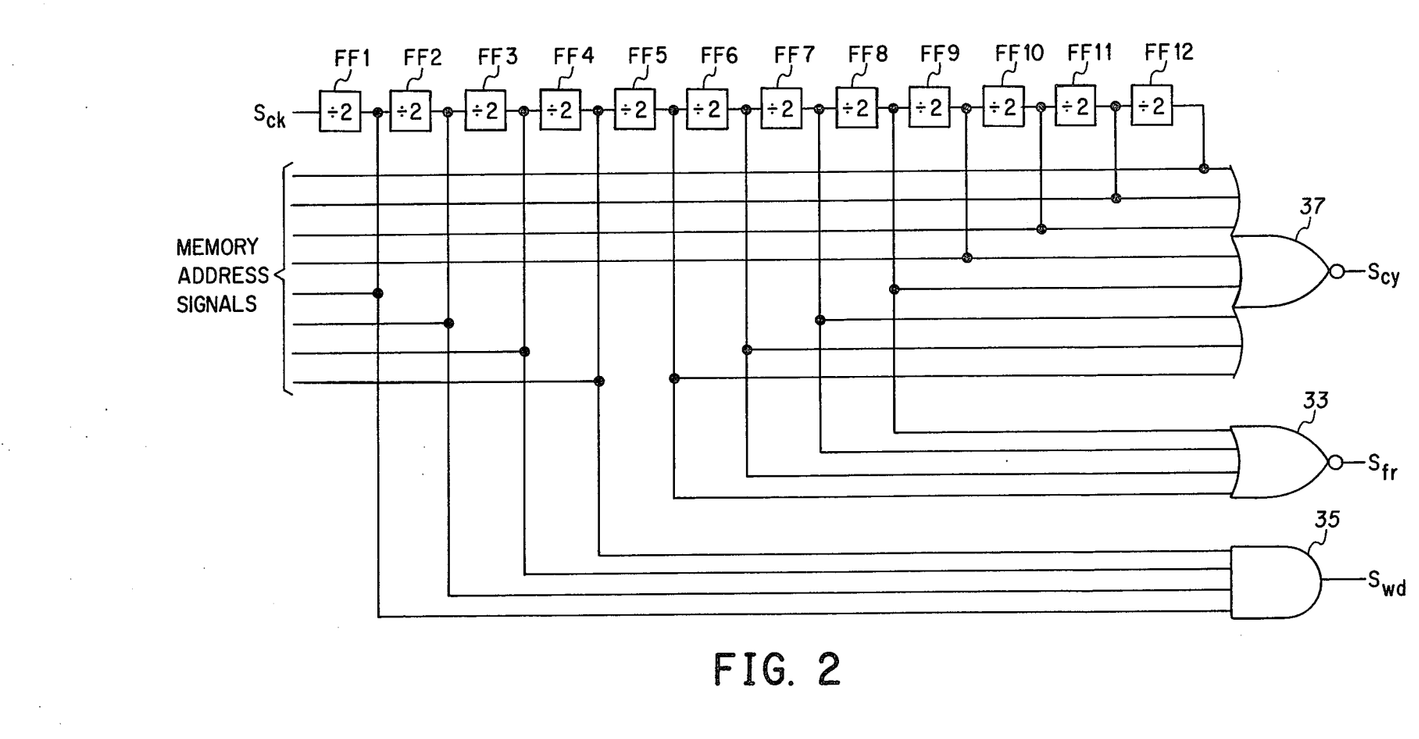
FIG. 2 is a block circuit diagram of the preferred master timing circuit generator employed in the FIG. 1a apparatus.

As indicated in FIGS. 1a and 1b, the clock source 29 provided the clock signal $S_{ck}$ whose individual pulses define the bit time boundries, and from which the master timing generator 31 derives timing control signals $S_{cy}$, $S_{fr}$, and $S_{wd}$, and also the memory address signals. FIG. 2, a schematic representation of the master timing generator, shows how said signals are derived. Twelve flip-flops, FF1 through FF12, are cascaded to form a count-up register and each provides a square wave output signal whose frequency is ½ the frequency of its input signal. Thus, the output of FF1 is a square wave whose frequency is ½ the frequency of $S_{ck}$ and whose period is 2 bit times long. The output of FF2 is a square wave whose frequency is ¼ the $S_{ck}$ frequency and whose period is 4 bit times long. Table 1 shows the frequency and period of each flip-flop output signal.

TABLE 1

| FF SIGNAL | FF SIGNAL FREQUENCY / $S_{ck}$ FREQUENCY | PERIOD IN BIT TIMES |
|---|---|---|
| FF1 out | $\frac{1}{2}$ | 2 |
| FF2 out | $\frac{1}{4}$ | 4 |
| FF3 out | $\frac{1}{8}$ | 8 |
| FF4 out | $\frac{1}{16}$ | 16 |
| FF5 out | $\frac{1}{32}$ | 32 |
| FF6 out | $\frac{1}{64}$ | 64 |
| FF7 out | $\frac{1}{128}$ | 128 |
| FF8 out | $\frac{1}{256}$ | 256 |
| FF9 out | $\frac{1}{512}$ | 512 |
| FF10 out | $\frac{1}{1024}$ | 1024 |
| FF11 out | $\frac{1}{2048}$ | 2048 |
| FF12 out | $\frac{1}{4096}$ | 4096 |

The outputs of FF5, FF6, FF7, and FF8 are inputs to NOR gate 33 which in turn produces at its output timing control signal $S_{fr}$. As indicated in FIG. 1b, and as should be apparent from the above-described circuit configuration, $S_{fr}$ is periodic, has a period of one frame time (i.e. 16 word times or 256 bit times) and within each period is high for the first word time and is low for the remaining 15 word times. The outputs of FF1, FF2, FF3, and FF4 are inputs to AND gate 35 to produce $S_{wd}$. The signal $S_{wd}$, is also periodic (see FIG. 1b), has a period of one word time (i.e., 16 bit times), and within each period is low for the first 15 bit times and is high during the last bit time. The outputs of FF5, FF6, FF7, FF8, FF9, FF10, FF11, and FF12 are inputs to NOR gate 37 to produce $S_{cy}$, which (see FIG. 1b) is periodic with a period of one-cycle time. Within each period, $S_{cy}$ is high for the first word time and is low for the remaining 255 word times. Moreover, the high state of $S_{cy}$ always occurs simultaneously with a high state of $S_{fr}$.

In accordance with the preferred embodiment, a different and predetermined one of 16 coefficients (each a 16 bit word) is called forth from the ROM during the first word time of each of 16 consecutive frame times. Thus, in addition to providing 256 different address combinations (one for each bit of 16, 16 bit words) the eight outputs of FF1 through FF4, and FF8 through FF12 (i.e., the memory address signals in FIGS. 1a and 2) provide the first group of 16 different parallel eight bit addresses during the first word time of the first frame, provide the second group of 16 different parallel eight bit addresses during the first word time of the second frame, and so on. As is apparent, the first group of 16 different addresses is repeated for each of the last 15 word times of the first frame, the second group of 16 different addresses is repeated for the last 15 word times of the second frame and so on. But, as will become apparent hereinbelow, such repetitions are inconsequential since whatever appears on multiplier input $i_{1m}$ during the second through 16th word time of each frame has no effect on the apparatus operation.

MEMORIES

As already discussed to some extent, memory 13 shown in FIG. 1a provides permanent storage for 256 bits of information. These 256 bits are individually accessible via the eight parallel address lines. The implied organization of the 256 bits of memory is 16 words of 16 bits each. Each word represents one of the 16 predetermined coefficients $A_0$ through $A_{15}$ and the most significant bit of each word represents the sign of the particular coefficient; i.e., 0 and 1 for + (plus) and − (minus) respectively. It should also be noted here that the preferred multiplier of arithmetic unit 11 employs two's complement notation. Thus, if a particular predetermined coefficient is negative, the most significant bit of the stored word representing this coefficient will be a 1 and the least significant 15 bits will be the two's complement of the absolute binary number representing the magnitude of that coefficient. For example, assuming $A_{15}$ and $A_{14}$ to be 0.6875 and −0.6875 respectively, the digital words representing each coefficient as stored in the ROM, are respectively, 0101100000000000 and 1010100000000000, reading most significant bit on the left to least significant bit on the right.

Shift registers 15, 17 and 19 each provide temporary storage for 16 bits of information. Being connected to the pole portion of one of SPDT switches 39, 41, and 43, the input of each shift register can be switched between a first switch terminal and a second switch terminal. Various implementations of these switches, including transistor implementations, may be employed. With the pole contacting the first terminal, each shift register input is connected to its own output and the data recirculates in the shift register at the $S_{ck}$ frequency so as to make each bit available at the output once every word time. With the pole contacting the second terminal, each shift register input is connected to a supply of new information and each shift register is loaded with (i.e., has written into itself) a new 16 bit word. Contact between pole and first terminal is established whenever the activating signal (i.e., $S_{cy}$ or $S_{fr}$) is in a logic zero condition (i.e., is low). Contact between pole and second terminal is established whenever the activating signal is in a logic one condition (i.e., is high). As should be apparent from FIGS. 1a and 1b, shift registers 15 and 19 each write a new word only during the first word time of each cycle time. Otherwise shift registers 15 and 19 recirculate their stored words. As should also be apparent, shift register 17 writes a new word only during the first word time of each frame time, and otherwise recirculates its stored word.

ARITHMETIC UNIT

As shown in FIG. 1a, arithmetic unit 11 comprises a serial digital adder 25 and a serial digital multiplier 27, each having two data inputs and one data output. One data input of adder 25 is coupled to the multiplier data output and one data input of multiplier 27 is coupled to the adder data output. The other adder data input is connected to the ROM 13 output and the other multiplier data input is connected to shift register 15 output. The control input "add" of adder 25 is connected to signal $S_{cy}$ via inverter 45. The control input "sub" of adder 25 is connected to a logic zero; i.e., ground. Because of the grounded input to the "sub" (subtract) terminal of the adder 25 and because of the inverter 45, signal $S_{cy}$ can command adder 25 to "add" or "or not add". When $S_{cy}$ is high (and thus $\overline{S_{cy}}$ is low) adder 25 does not add or subtract B to/from $\alpha$ (see FIG. 3). When $S_{cy}$ is low (and thus $\overline{S_{cy}}$ is high) adder 25 adds.

Figure 3:
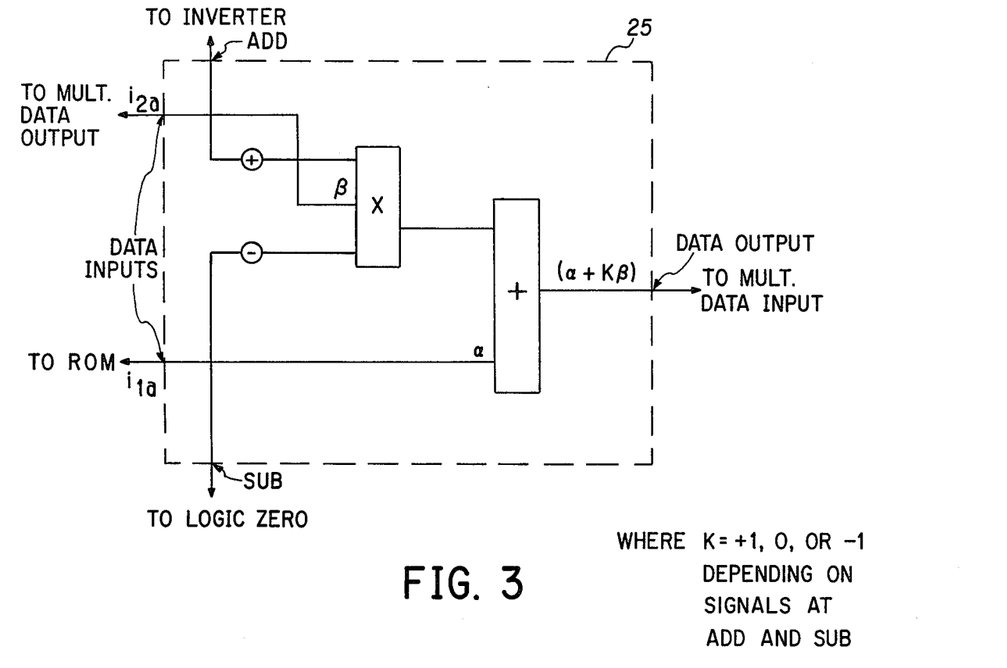
FIGS. 3 and 4 are functional and schematic diagrams respectively of the preferred adder employed in the FIG. 1a apparatus.
Figure 4:
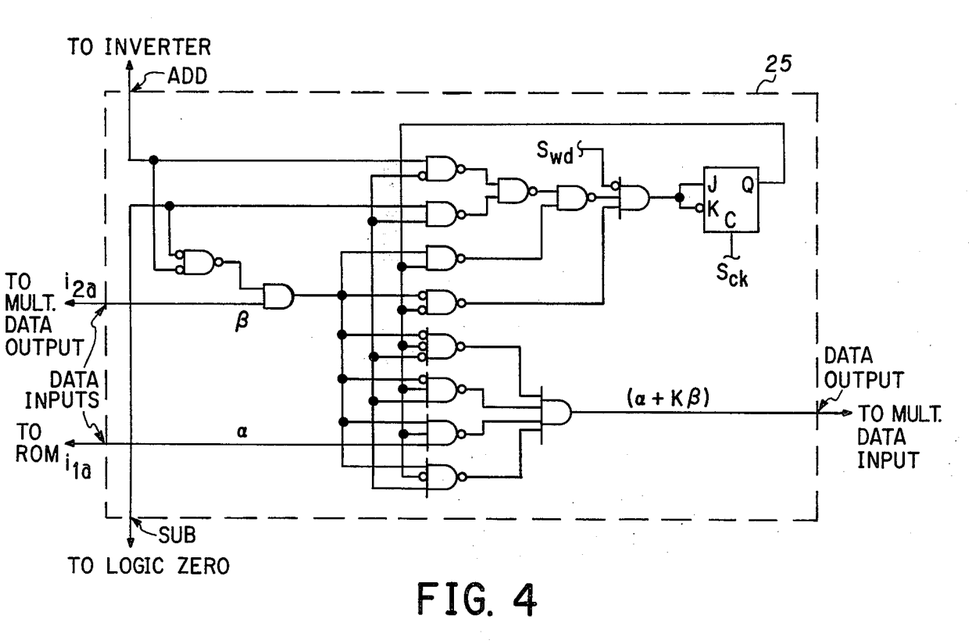

The preferred embodiment of adder 25, and its operation, are shown in more detail in FIGS. 3 and 4 in which the various connections to outside circuitry are appropriately labeled to conform with the FIG. 1a illustration. FIG. 3 provides a functional description and indicates that the effect of the adder is to produce, for input words $\alpha$ and $\beta$ an output word. The output word is $\alpha+\beta$, or $\alpha-\beta$, or $\alpha$, in accordance with the Adder Logic Table below:

ADDER LOGIC TABLE

| ADD | SUB | OUTPUT |
|---|---|---|
| 0 | 0 | $\alpha$ |
| 1 | 0 | $\alpha+\beta$ |
| 0 | 1 | $\alpha-\beta$ |

FIG. 4 shows that the preferred adder embodiment comprises a variety of logic gates and a JK flip-flop. The preferred adder 25 is further expanded on in U.S. Pat. No. 3,757,261 entitled "Integration and Filtration Circuit Apparatus" and assigned to the Assignee of the present invention. The teachings of this referenced patent are hereby incorporated by reference into the present disclosure for a more complete presentation. The particularly pertinent parts of U.S. Pat. No. 3,757,261 are FIGS. 1, 5, 6, 7, and 8 thereof, and columns 3, 4, and 5 thereof. FIG. 3 herein corresponds to FIG. 5 of the referenced patent, and FIG. 4 herein corresponds to the top half of FIG. 1 of the referenced patent. Since the notation herein is different from that employed in the referenced patent, Table 2 below sets out the correspondence:

TABLE 2

| DESIGNATOR IN FIGURES 3 AND 4 HEREIN | Is | DESIGNATOR IN FIGURES 1 and 5 OF PATENT NO. 3,757,261 |
|---|---|---|
| $\alpha$ | | A |
| $\beta$ | | B |
| add | | $\Delta Y^+$ |
| sub | | $\Delta Y^-$ |
| $S_{wd}$ | | SB |
| $S_{ck}$ | | C |

Figure 5:
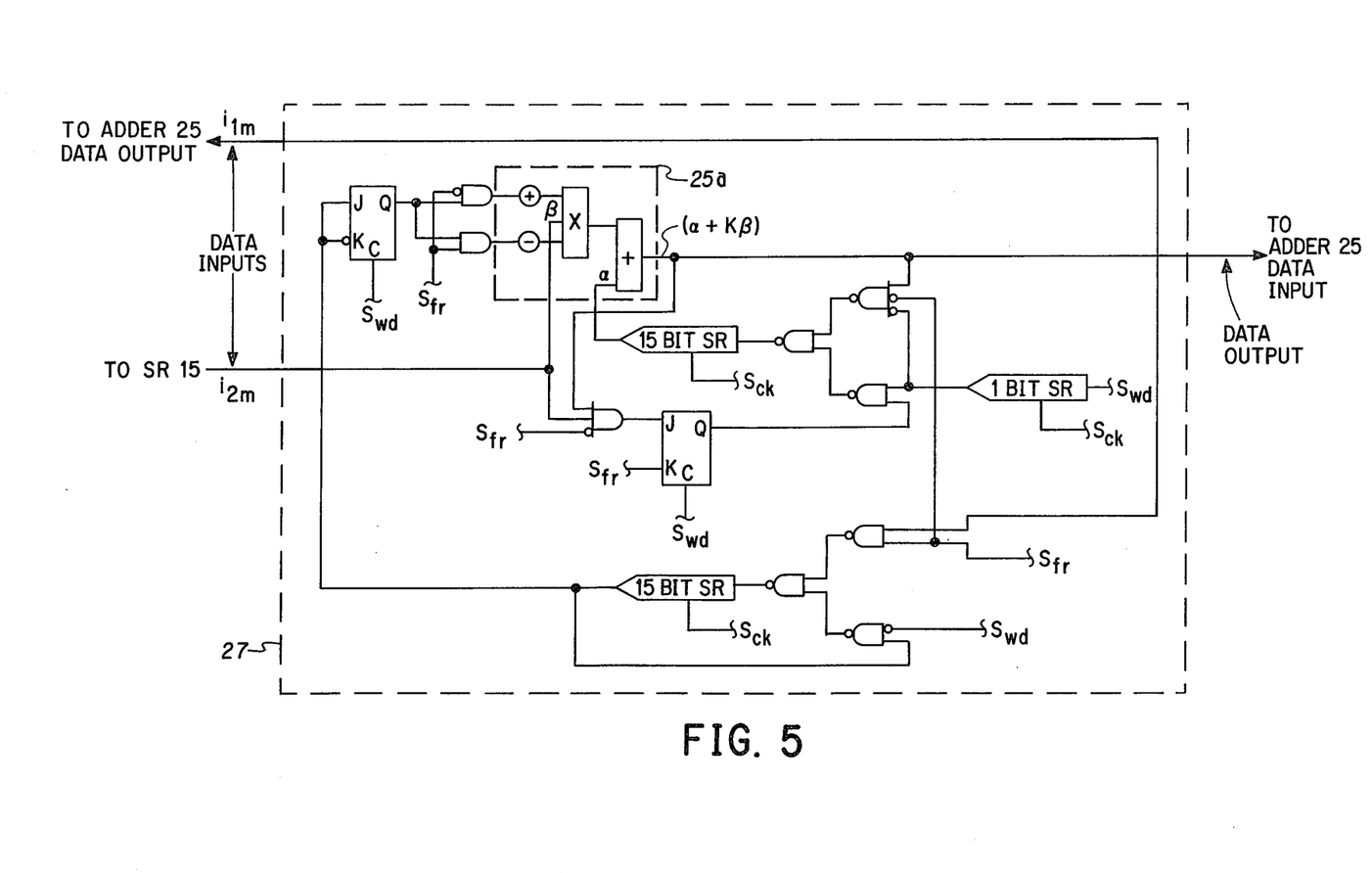
FIG. 5 is a schematic diagram of the preferred multiplier employed in the FIG. 1a apparatus.

The preferred embodiment of multiplier 27 is shown in FIG. 5 and comprises an adder 25a (identical to the one above described and shown in the FIGS. 1a, 3, and 4) and also various logic gates, JK flip-flops, and shift registers. The various connections to outside circuitry are appropriately labeled to conform with the FIG. 1a illustration. For a 16 bit digital word appearing at $i_{1m}$ during word time 1 and a 16 bit digital word appearing at $i_{2m}$ during word times 2 through 17, and further assuming that each of the 16 bit words appears LSB first and includes a sign bit as its MSB, then the effect of the multiplier is to provide during word time 17 a 16 bit digital word whose bits are the 16 most significant bits of the product of the two inputs. A detailed description of this multiplier 27 and its operation appears in U.S. Pat. No. 3,761,699 entitled "Multiplication by Successive Addition with Two's Complement Notation" and assigned to the Assignee of the present invention. The teachings of this referenced patent are hereby incorporated by reference into the present disclosure for a more complete presentation. The entire referenced patent is considered pertinent. FIG. 5 herein corresponds in part to FIG. 1 of U.S. Pat. No. 3,761,699. Since the notation herein is different from that employed in the referenced patent, Table 3 below sets out the correspondence:

TABLE 3

| IN FIGURE 5 HEREIN | IN FIGURE 1 OF PATENT 3,761,699 |
|---|---|
| $S_{fr}$ | $N_o$ |
| $S_{wd}$ | SB |
| $i_{2m}$, or word at $i_{2m}$ | J |
| $i_{1m}$, or word at $i_{1m}$ | I |
| Output | 52 |

It should also be pointed out that the two 7 bit shift registers shown in FIG. 1, of U.S. Pat. No. 3,761,699 have each become a 15 bit shift register in FIG. 5 herein. It should be apparent that the change from 7 bit shift registers to 15 bit shift registers is merely to accommodate a different word size. Moreover, the switch and 8 bit shift register shown in FIG. 1 of the referenced U.S. Pat. No. 3,761,699 retrieving the multiplier output is not employed in the FIG. 5 embodiment herein. Instead, the multiplier output herein is coupled directly to adder 25 data input $i_{2a}$.

AUXILIARY ADDER

The preferred embodiment of adder 21 is identical to that of the adder 25 shown in FIGS. 1a, 3, and 4 and described hereinabove and in the referenced U.S. Pat. No. 3,757,261. As seen from FIG. 1a, in the preferred embodiment, for evaluating the altitude versus pressure function the auxiliary adder constantly receives a "subtract" command via control terminal CT1. The auxiliary adder permits the combining of some quantity designated herein as Q with $$\sum_{j=0}^{n} A_j X^j.$$

In present applications, Q, in digital word form of course, can represent various quantities such as constants (including zero), variables (for example, $X(t_i)$), or even other evaluated functions of X such as other evaluated polynomials $$\sum_{j=0}^{n} B_j X^j,$$

or $CX$, or $X^{1/2}$, or whatever the user deems necessary to achieve his desired results. In particular, in the preferred embodiment for evaluating the altitude versus pressure function, Q is formed by strapping $OUT_2$ to $IN_2$ and thus $Q=X(t_1)$.

OPERATION

As previously described in various degrees of detail, the FIG. 1a apparatus performs a series of multiplications and additions according to the nested form of the 15th order polynomial. FIG. 6 describes in considerable detail this basic operation of the preferred embodiment by illustrating the serial digital words, in terms of what they represent, which appear during selected word times at key locations within the FIG. 1 apparatus.

Turning now to FIG. 6, it is seen that during word time 1, the digital word representing $X(t_1)$ appears at $IN_1$ and the digital word representing $A_{15}$ appears at the adder 25 data input $i_{1a}$. Also, during word time 1, since $S_{cy}$ is high, adder 25 receives a "do not add" command and the digital word representing $A_{15}$ passes unaltered through adder 25 and appears at adder 25 data output and also at multiplier data input $i_{1m}$. Also, with $S_{cy}$ high during word time 1 and thus with the pole of switch 39 in its "up" position, shift register 15 is writing in the new word $X(t_1)$ and is reading out $G_1$. As indicated in FIG. 6, $G_1$ can be any 16 bit digital word. Moreover if the apparatus has been on and operating for a while, $G_1$ is the digital word representing the previous $X_i$, i.e., the word present at $IN_1$ during previous $S_{cy}$ = high. Similarly, since $S_{fr}$ is high and the pole of switch 41 is in its "up" position, shift register 17 is writing $A_{15}$ and is reading $G_3$ where $G_3$ might be any digital word and could well be a previous polynomial evaluation using $X(t_0)$. The multiplier output during word time 1, $G_2$, may also be any digital word, including a previous product involving $X(t_0)$. The auxiliary adder output $G_4$ is of course the difference of the shift register 17 output and whatever word appears at $IN_2$ (designated as $Q$) and for word time 1, this difference is $G_3-Q$. The word at $OUT_1$ during word time 1, since $S_{cy}$ is high and the pole of switch 43 is in the "up" position, is the same as the auxiliary adder output, namely $G_4$.

It should be noted that FIG. 6 shows that $X(t_1)$ continuously appears at $IN_1$ (i.e., appears at $IN_1$ every word time). Appearance of $X(t_1)$ at $IN_1$ for word times 2 through 256 is unnecessary however since $X(t_1)$ is loaded into shift register 15 during word time 1.

Continuing now to word time 2, it is seen from FIG. 6 that with $X(t_1)$ now available at multiplier data input $i_{2m}$, the multiplier outputs a first partial product designated PP1. As an example of what is meant herein by partial product, in the multiplication of 1234 by 5678, the first partial product would be 1234×8, the second partial product would be 1234×78, the third partial product would be 1234×678, and so on. It should also be noted that $A_{15}$ continues to appear at adder 25 data input $i_{1a}$ and thus, the adder outputs the sum PP1+$A_{15}$ which in turn appears at multiplier data input $i_{1m}$. The words representing such partial products and such sums including the partial products are meaningless and harmless however, since only those words appearing at multiplier data input $i_{1m}$ during a high state of $S_{fr}$ ever enter the multiplier. (This may be seen from FIG. 5 where it is shown that the words at $i_{1m}$ and the signal $S_{fr}$ are combined in a NAND gate.) PP1, and PP1+$A_{15}$, are included in FIG. 6 merely for completeness and not because they have any effect on the apparatus' final output.

Shift register 17 having written $A_{15}$ during word time 1, now reads $A_{15}$, and auxiliary adder of course outputs $A_{15}-Q$. Both of these outputs are harmless and meaningless and as with PP1, and PP1+$A_{15}$, are shown in FIG. 6 merely for completeness. The word at $OUT_1$, since shift register 19 wrote $G_4$ during word time 1, continues to be $G_4$.

Similar to word time 2, word times 3 through 16 are intermediate periods of time in which the multiplier is working toward a final product and is outputting partial products. As with word time 2, the outputs of adder 25, shift register 17, auxiliary adder, and shift register 19 are meaningless and have no effect on the desired final result.

During word time 17, the multiplier completes its operation for the first two input words ($A_{15}$ and $X(t_1)$) and outputs a digital word representative of $A_{15} \cdot X(t_1)$. This first product is designated as $P_1$. Also, during word time 17, a new coefficient, $A_{14}$ appears at adder 25 data input $i_{1a}$, is summed with $P_1$ appearing at adder 25 input data $i_{2a}$, and adder 25 outputs a digital word representative of $P_1 + A_{14}$, designated as $W_1$. Shift register 17 writes the new word $W_1$ and reads the old word $A_{15}$. OUT continues to provide $G_4$.

As is seen from FIG. 6, the above operations are repeated so that during the first word time of each following frame, a new product ($P_2$, $P_3$, $P_4$, etc.) and a new sum ($W_2$, $W_3$, $W_4$, etc.) are provided. At the 241st word time (i.e., the first word time of the 16th frame) the final product $P_{15}$ and final sum $W_{15}$ are provided, where $W_{15}$ is the evaluation of the entire polynomial using $X(t_1)$. During the 241st word time, shift register 17 writes the new word $W_{15}$ and makes $W_{15}$ available at its output during the 242nd word time and on through the next occurrence of a high state of $S_{fr}$, i.e., through the 257th word time.

$W_{15}$ is combined in the auxiliary adder with the $IN_2$ word, Q, and the difference is provided for the period encompassing the 242nd through 257th word time at the auxiliary adder data output. During the 257th word time, $W_{15} - Q$ appears at $OUT_1$ and is loaded into shift register 19. Thus, $W_{15} - Q$ appears at $OUT_1$ for the period encompassing the 257th word time through the 512th word time.

It should be noted that the multiplier will continue to work during the period encompassing the 242nd through 257th word times and will output a product $W_{15} \cdot X(t_1)$. This product is meaningless and furthermore does not interfere with the operation since it is never summed in adder 25. Instead, adder 25 at word time 257 receives a "do not add" command and the adder output is $A_{15}$ and not $A_{15} \cdot X(t_1)$.

As should be apparent from FIG. 6, a new $X_i$ (i.e., $X(t_2)$) appears at $IN_1$ during word time 257 and the evaluation cycle begins again using the new $X(t_2)$ so that at the 497th word time, a new polynomial evaluation $W_{15}$ is produced at the adder 25 output then during the period encompassing word time 513 through word time 768, $W_{15} - Q$ is provided at $OUT_1$.

A SPECIFIC APPLICATION

When the FIG. 1a embodiment is employed, as earlier mentioned, to provide outputs indicative of altitude from inputs indicative of pressure, $IN_1$ is connected to the output of an A/D converter whose input in turn is connected to the output of a pressure sensor. The correlation between the particular 16 bit words supplied at $IN_1$ and the particular pressures sensed are shown in Table 3 below. For the particular pressure range of interest (3.5 to 31.0 inches of mercury), the particular coefficients $A_j$ employed and the particular Q employed are shown in Table 4 in digital word form. The coefficients shown in Table 4 were selected by curve fitting over the pressure range of interest using the least squares method.

TABLE 3

| PRESSURE (IN. HG.) | 16 BIT WORD AT $IN_1$ |
|---|---|
| | MSB ↓         LSB ↓ |

TABLE 3-continued

| PRESSURE (IN. HG.) | 16 BIT WORD AT $IN_1$ |
|---|---|
| 32.7675 | 0111111111111111 |
| 28.6720 | 0110000000000000 |
| 24.5760 | 0100000000000000 |
| 20.4800 | 0010000000000000 |
| 16.3845 | 0000000000000001 |
| 16.3840 | 0000000000000000 |
| 16.3835 | 1111111111111111 |
| 12.2880 | 1110000000000000 |
| 8.1920 | 1100000000000000 |
| 4.0960 | 1010000000000000 |
| 0.0000 | 1000000000000000 |

TABLE 4

| | 16 BIT WORD EMPLOYED FOR PRESSURE/ALTITUDE APPLICATION |
|---|---|
| | MSB ↓         LSB ↓ |
| $A_{15}$ | 0000 0000 0000 0000 |
| $A_{14}$ | 0000 0000 0000 0000 |
| $A_{13}$ | 0000 0000 0000 0000 |
| $A_{12}$ | 0000 0000 0000 0000 |
| $A_{11}$ | 0000 0000 0000 0000 |
| $A_{10}$ | 0001 0111 0100 1101 |
| $A_9$ | 1100 0010 1101 1010 |
| $A_8$ | 0010 0111 1101 0101 |
| $A_7$ | 0000 1111 1110 1000 |
| $A_6$ | 1110 1111 1011 1001 |
| $A_5$ | 1111 0010 1010 1110 |
| $A_4$ | 0001 0110 0001 1111 |
| $A_3$ | 1110 0111 1101 1111 |
| $A_2$ | 0010 0110 1100 1100 |
| $A_1$ | 0001 1111 1010 0101 |
| $A_0$ | 1101 1101 1000 0100 |
| Q | $OUT_2$ |

While a particular embodiment of the present invention has been shown and described, it is apparent that changes and modifications may be made therein without departing from the invention in its broader aspects. The aim of the appended claims, therefore, is to cover all such changes and modifications as fall within the true spirit and scope of the invention.

What is claimed is:

1. Digital function generator apparatus for providing an output Y from an input X according to $$Y = f(X) = \sum_{j=0}^{n} A_j X^j$$

where the coefficients $A_j$ are predetermined, said apparatus comprising:
   first means comprising digital memory means for storing and supplying serial digital data representative of said coefficients $A_0$ through $A_n$;
   second and third means comprising, respectively, serial digital adder means and serial digital multiplier means, each of said second and third means having first and second data input means and a data output means, said first data input means of said second means connected for receiving serial digital data from said first means, said first data input means of said third means connected for receiving serial digital data representative of at least one particular value $x_i$ of the input X, said second data input means of said second means connected for receiving serial digital data from said data output means of said third means, and said second data input means of said third means connected for receiving serial digital data from said data output means of said second means;

fourth means including clock source means and timing generator means receiving the output of said clock source means, said fourth means comprising timing control means for i. effecting multiplication by said third means of $A_n$ and $X_i$ such that the output of said third means is serial digital data representative of a first product $A_n \cdot X_i = P_1$, ii. effecting the addition by said second means of said first product $P_1$ and $A_{n-1}$ such that the output of said second means is serial digital data representative of a first sum $(P_1 + A_{n-1}) = W_1$, iii. effecting the multiplication by said third means of said first sum $W_1$ and $X_i$ such that the output of said third means is serial digital data representative of a second product $W_1 \cdot X_i = P_2$, iv. effecting the addition by said second means of $P_2$ and $A_{n-2}$ so that the output of said second means is serial digital data representative of a second sum $(P_2 + A_{n-2}) = W_2$, and v. repetitively effecting similar alternating multiplications and additions so as to produce a series of products and sums wherein any particular $j$th sum $W_j$ is equal to $P_j + A_{n-j}$ for $j = 1$ through $n$, where the $j$th product $P_j = W_{j-1} \cdot X_i$ and $W_0$ is defined to be equal to $A_n$, said fourth means repetitively effecting said multiplications and additions at least until serial digital data representative of the sum $W_{n-1} \cdot X_i + A_0$ appears at the data output means of said second means, said sum $W_{n-1} \cdot X_i + A_0$ being equal to $$\sum_{j=0}^{n} A_j X_i^j.$$

2. The combination comprising apparatus as defined in claim 1 and comprising in addition fifth means comprising temporary storage means for supplying, under the control of said fourth means, to said first data input means of said third means the serial digital data representative of $X_i$.

3. The combination comprising apparatus as defined in claim 2 and comprising in addition sixth means comprising temporary storage means for retrieving and temporarily storing, under the control of said fourth means, the serial digital data from said second means which is representative of $$\sum_{j=0}^{n} A_j X_i^j.$$

4. The combination comprising apparatus as defined in claim 1 and comprising in addition a further serial digital adder means with two data input means and onen data output means, said further adder means connected for receiving serial digital data representative of $$\sum_{j=0}^{n} A_j X_i^j$$

at one of its data input means and predetermined serial digital data $Q$ at its other data input means, the further adder means being controlled in at least one of an add or a subtract mode to provide at its data output means serial digital data representative of $$\sum_{j=0}^{n} A_j X_i^j \pm Q.$$

5. The combination comprising (a) arithmetic means for use in generating under appropriate timing control an output $Y$ in serial digital form from an input $X$ also in serial digital form according to $$Y = \sum_{j=0}^{n} A_j X^j$$

where the coefficients $A_j$ are available from a memory in serial digital form, said arithmetic means comprising serial digital adder means and serial digital multiplier means each having two data input means and one data output means, a data input means of said adder means being connected for receiving serial digital data from said data output means of said multiplier means, a data input means of said multiplier means being connected for receiving serial digital data from said data output means of said adder means, the other data input means of said adder means providing means for receiving serial digital data representative of the coefficients $A_j$, and the other data input means of said multiplier means providing means for receiving serial digital data representative of at least one particular value $X_i$ of the input $X$, and (b) first temporary storage means for supplying, under appropriate timing control, to said multiplier means the serial digital data representative of $X_i$.

6. The combination comprising the combination as defined in claim 5 and comprising in addition second temporary storage means for retrieving and temporarily storing, under appropriate timing control, predetermined serial data from said data output means of said adder means.

7. The combination comprising (a) arithmetic means for use in generating under appropriate timing control an output $Y$ in serial digital form from an input $X$ also in serial digital form according to $$Y = \sum_{j=0}^{n} A_j X^j$$

where the coefficients $A_j$ are available from a memory in serial digital form, said arithmetic means comprising serial digital adder means and serial digital multiplier means each having two data input means and one data output means, a data input means of said adder means being connected for receiving serial digital data from said data output means of said multiplier means, a data input means of said multiplier means being connected for receiving serial digital data from said data output means of said adder means, the other data input means of said adder means providing means for receiving serial digital data representative of the coefficients $A_j$, and the other data input means of said multiplier means providing means for receiving serial digital data representative of at least one particular value $X_1$ of the input $X$, and (b) a second serial digital adder means having two data input means and one data output means, said second adder means connected for receiving at one of its data input means serial digital data representative of $$Y_i = \sum_{j=0}^{n} A_j X_i^j$$

where $Y_1$ is $Y$ evaluated using a particular $X_1$, and for receiving at its other data input means predetermined serial digital data $Q$, said second adder means being controllable in at least one of an add or subtract mode to provide at its data output means serial digital data representative of $$\sum_{j=0}^{n} A_j X_i^j \pm Q.$$

* * * * *

UNITED STATES PATENT OFFICE
CERTIFICATE OF CORRECTION

PATENT NO. : 3,962,573
DATED : June 8, 1976
INVENTOR(S) : Lewis E. Staley

It is certified that error appears in the above-identified patent and that said Letters Patent are hereby corrected as shown below:

IN THE SPECIFICATION:

Column 2, line 29, please delete the hyphenated expression

"$X(X(\cdots(X(X(X(A_n)+A_{n-1})+A_{n-2})+A_{n-3})\cdots+A_2)-+A_1)+A_0.$"

and substitute therefor on one line the unhyphenated expression $--X(X(\cdots(X(X(X(A_n)+A_{n-1})+A_{n-2})+A_{n-3})\cdots+A_2)+A_1)+A_0.--$ .

Column 3, lines 34-35, delete "product" and substitute therefor --produce--.

Column 3, line 36, delete the hyphenated expression

"$[A_{15} \cdot X(t_1-)+A_{14}]X(t_1)$"

and substitute therefor on one line the unhyphenated expression $--[A_{15} \cdot X(t_1)+A_{14}]X(t_1)--$ .

Column 3, line 58, delete "provided" and substitute therefor --provides--.

Column 6, line 2, delete "or", second occurrence, and substitute therefor --do--.

UNITED STATES PATENT OFFICE
CERTIFICATE OF CORRECTION

PATENT NO. : 3,962,573
DATED : June 8, 1976
INVENTOR(S) : Lewis E. Staley

It is certified that error appears in the above-identified patent and that said Letters Patent are hereby corrected as shown below:

Column 7, line 55, delete "$X\frac{1}{2}$" and substitute therefor --$X^{1/2}$--.

Column 7, line 59, delete "$Q=X(t_1)$" and substitute therefor --$Q=X(t_i)$--.

Column 9, line 40, delete "$A_{15} \cdot X(t_1)$" and substitute therefor

--$A_{15}+W_{15} \cdot X(t_1)$--.

Column 9, line 45, delete "$W_{15}$" and substitute therefor --$W_{15}'$--.

Column 9, line 47, delete "$W_{15}-Q$" and substitute therefor --$W_{15}'-Q$--.

IN THE CLAIMS:

Column 10, line 64, delete "$x_i$" and substitute therefor --$X_i$--.

Column 11, line 32, delete the hyphenated expression

"$W_{n-1} \cdot X$-

$_i + A_0$"

and substitute therefor on one line the unhyphenated expression

--$W_{n-1} \cdot X_i + A_0$--.

UNITED STATES PATENT OFFICE
CERTIFICATE OF CORRECTION

PATENT NO. : 3,962,573
DATED : June 8, 1976
INVENTOR(S) : Lewis E. Staley

It is certified that error appears in the above—identified patent and that said Letters Patent are hereby corrected as shown below:

Column 11, line 59, delete "onen" and substitute therefor --one--.

Column 13, line 8, delete "$Y_1$" and substitute therefor --$Y_i$--.

Column 13, line 8, delete "$X_1$" and substitute therefor --$X_i$--.

Signed and Sealed this

Seventh Day of September 1976

[SEAL]

Attest:

RUTH C. MASON
Attesting Officer

C. MARSHALL DANN
Commissioner of Patents and Trademarks